United States Patent [19]

Karanik

[11] Patent Number: 4,477,040
[45] Date of Patent: Oct. 16, 1984

[54] AIRCRAFT WIND ENERGY DEVICE

[75] Inventor: James J. Karanik, Farmingville, N.Y.

[73] Assignee: Grumman Aerospace Corporation, Bethpage, N.Y.

[21] Appl. No.: 180,763

[22] Filed: Aug. 25, 1980

Related U.S. Application Data

[63] Continuation of Ser. No. 952,798, Oct. 19, 1978, abandoned.

[51] Int. Cl.³ ............................................. B64D 31/00
[52] U.S. Cl. ...................................... 244/58; 290/55; 415/2 A
[58] Field of Search ............... 244/53 B, 58, 130, 198, 244/199, 204, 207–210; 415/2 R, 2 A; 290/44, 45

[56] References Cited

U.S. PATENT DOCUMENTS

| 2,706,255 | 4/1955 | Breaux et al. | 244/58 |
| 3,315,085 | 4/1967 | Mileti et al. | 290/55 |
| 3,776,489 | 12/1973 | Wen et al. | 244/204 |
| 4,021,135 | 5/1977 | Pedersen et al. | 415/2 A |
| 4,070,131 | 1/1978 | Yen | 290/55 |

FOREIGN PATENT DOCUMENTS

| 1032033 | 6/1958 | Fed. Rep. of Germany | 244/58 |
| 880130 | 3/1943 | France | 290/55 |

Primary Examiner—Galen L. Barefoot
Attorney, Agent, or Firm—Richard G. Geib

[57] ABSTRACT

A tornado-type wind energy system is provided which is suitable for aircraft in flight or emergency use. Wind energy propels a turbine to provide shaft power to drive an electrical generator or the like. A vortex flow regime is produced downstream of the ram air driven turbine. The creation of a low pressure core draws ram air by the turbine at an increased rate, thereby generating greater shaft power to a load.

5 Claims, 6 Drawing Figures

AIRCRAFT WIND ENERGY DEVICE

This is a continuation of application Ser. No. 952,798 filed Oct. 19, 1978, now abandoned.

SUMMARY OF THE INVENTION

This invention relates to wind turbine devices, and more particularly, to devices of this type which employ vortex generators to increase the rate of air flow through the turbine.

The use of wind energy to provide power is a practice which dates back to the fifteenth century in Europe. Since that time, the medieval wind mill has been improved in many respects and, in many cases, replaced entirely by more efficient wind transducers which are both less bulky and produce more useable energy.

U.S. Pat. No. 4,070,131, assigned to the common assignee of this invention, discloses an example of one such alternate approach to producing energy from the wind. The system taught in this reference relates to a stationary tornado-type wind turbine device for converting wind energy into electrical power. The device is of a generally tubular construction which selectively admits tangential atmospheric wind in order to produce a vortex flow regime within the throat of the device. This flow creates a low pressure core which draws ambient air past the turbine blades and thereby provides motive force to an associated electrical generator.

While providing increased wind derived power from a device of reduced size, this and other prior art references have failed to provide a tornado-type wind transducer which is suitable for use in conjunction with a moving aircraft. It is in this area that the present invention is directed.

The advantages of providing tornado-type wind turbines on aircraft include affording an available source of power in the event of power supply malfunction or other emergency conditions. Additionally, such a system can provide reliable auxiliary power capable of meeting the requirements of various aircraft associated devices while reducing the necessary fuel consumption. Primary design objectives include high power output at a wide range of operating speeds, minimal weight and volume, and low structural impact on flight characteristics.

Accordingly, it is a principal object of the present invention to provide an improved wind turbine suitable for use in an aircraft environment.

It is a further object of the invention to augment wind turbine efficiency by incorporating a vortex generator within a wind energy transducer, downstream of a rotating turbine.

The aforementioned objects and advantages are achieved in the present invention by providing apparatus including a ram air inlet duct, a rotating turbine, and a secondary inlet located downstream of the turbine and adapted to induce a tornado-type effect to the air admitted therethrough so as to increase the velocity of air flowing through the turbine.

The secondary duct may take the form of an aperture in the tower having an associated fluid directive member. Air entering the aperture is turned by the member to produce a vortex flow regime which continually accelerates air flowing through the tower along the length of the aperture. A low pressure core is created by the vortex and serves to augment the pressure differential felt in the region of the turbine as to increase wind flow speed through the tower and correspondingly increase the turbine rotational speed resulting from a given wind velocity.

DESCRIPTION OF THE INVENTION

Figure 1:
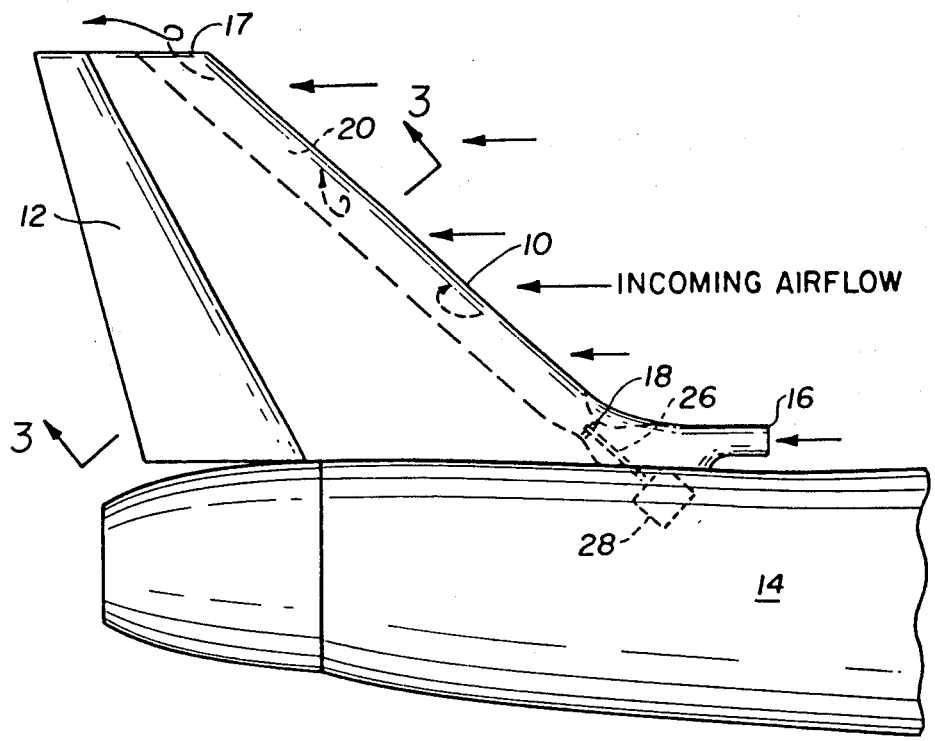
FIG. 1 is a side elevation view of the wind turbine as incorporated into the vertical fin of an aircraft.
Figure 2:
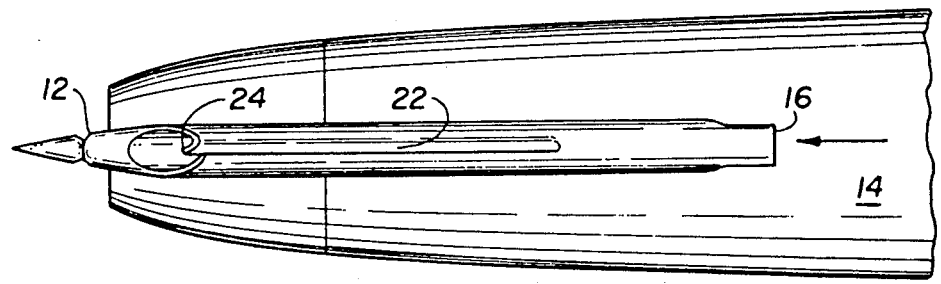
FIG. 2 is a top plan view of vertical fin assembly of FIG. 1.
Figure 3:
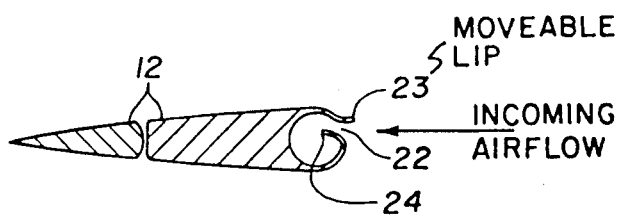
FIG. 3 is a cross-sectional view of the fin assembly of FIG. 1, as viewed along lines 3—3.

FIGS. 1, 2 and 3 show wind turbine device 10 mounted on the leading edge of vertical fin assembly 12 of aircraft 14. Device 10 includes ram air inlet duct 16, turbine blades 18, tower 20 and longitudinal slot 22 with associated vortex turning vane 24.

As aircraft 14 moves forward, ram air enters tower 20 through inlet duct 16. The pressure of this air induces a positive pressure on the upstream side of blades 18, causing the blades to rotate about shaft 26. Air also enters tower 20 through slot 22 and is channelled by turning vane 24 into a vortex. This fluid motion creates a low pressure core downstream of turbine blades 18. Air entering into inlet duct 16 is attracted by this low pressure core and thereby accelerated through blades 18. Subsequently, the air leaves the tower through discharge duct 17.

The rotational speed of the blades, being responsive to the air speed into duct 16, is thereby increased effecting a corresponding increase in the power output derived from associated generator 28, or a similar device. Output shaft power may be coupled to various transducer mechanisms to supply electrical, hydraulic or compressive power as desired. As will be obvious to one skilled in the art, various propeller means and transducer mechanisms may be used in connection with the present invention. Propeller/transducer systems such as those described in U.S. Pat. Nos. 3,315,085 and in 4,021,135. As is also demonstrated by U.S. Pat. No. 3,315,085, various types of loads (i.e., electrical or hydraulic) may be driven by aircraft wind energy devices. The available space and design requirements of the particular aircraft are among the factors relating to the construction employed.

Slot 22 is shown extending longitudinally for substantially the length of tower 20 and may include lip 23 and turning vane 24. These members collectively provide rotational motion to the air entering the tower through the slot and may be moveably connected to tower 20 as to regulate or completely preclude the flow of air through slot 22. Inside the tower air is continually turned along the length of the slot as long as the aircraft remains in motion. Lip 23 may be rigidly fixed to tower 20 or may be adjustably attached as to completely preclude or regulate the airflow through slot 22.

In operation, when the vortex strength (a function of the free stream wind velocity and the tower radius) is large, a significant pressure differential may be maintained across the turbine.

This pressure differential is equivalent to a force considerably greater than the dynamic head of the air entering duct 16 and will result in high air velocities and a high power density in the turbine capable of producing a much larger power output than can be achieved by a similar sized turbine of conventional design.

When compared to a conventional ram air turbine, the tornado wind power concept offers several advantages, which include decreased weight and volume requirements as well as increased efficiency. The shaft output power, $\mathbb{P}$, produced by the device, is given by:

$$\mathbb{P} = \eta \iint \left(\frac{p}{\rho} + \frac{V^2}{2}\right) e^V \cdot d\overline{A}$$

where the integration is carried out over a control surface area, A, enclosing the entire system, and
  $\mathbb{P}$ is the shaft power output
  $\eta$ is the system efficiency
  $v$ is the free stream velocity
  p the free stream pressure, and
  $\rho$ is the free stream density While conventional ram air turbines use only the wind kinetic energy $v^2/2$, the tornado concept also uses the wind pressure energy $p/\rho$, which is considerably larger than the kinetic energy, especially at low speeds. Also, in contrast to ram air turbines in which the incoming air is continuously slowed, the proposed system accelerates the incoming wind within the system continually and allows the air to slow down only after it exits the tower. In this manner, losses due to the inertia of the air are minimized and system efficiency is enhanced.

Figure 4:
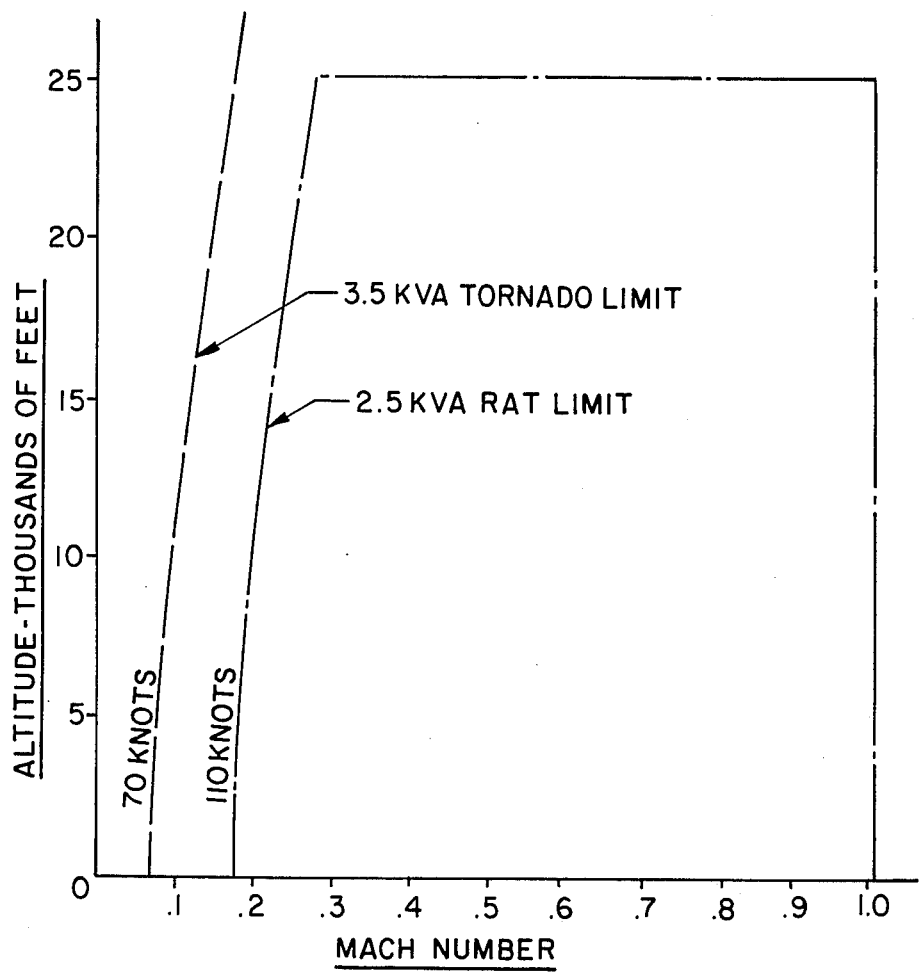
FIG. 4 is a graphical comparison of a device constructed in conformance with the present invention as contrasted to a presently available ram air turbine unit.

FIG. 4 graphically compares the performance characteristics of a fin mounted version of the present invention (as shown in FIGS. 1-3) with those of a conventional, wing mounted ram air turbine. The conventional system is rated at 2.5 KVA and has an operating envelope as shown. A tornado power turbine, sized to fit the vertical fin of the same aircraft produces a considerably greater output (3.5 KVA) even at lower speeds. Here the lowest operating speed was determined by the minimum flight velocity of the aircraft tested. Further advantages of the tornado power turbine relates to the reduced structural impact of the invention. While producing more power, the present invention is also lighter, takes up less volume and creates less aerodynamic drag.

In FIGS. 1, 2 and 3 tower 20 is shown as forming a portion of the leading edge of vertical fin 12. It should be pointed out that the apparatus is not necessarily limited to vertical mounting. It can also be horizontally mounted (as in the leading edge of a wing) or can be fixed to a surface situated on a plane between the vertical and horizontal planes. Engine pylons, flaptrack fairings and bomb rack pylon adapters are but a few of the members which could suitably accommodate the present invention.

Figure 5:
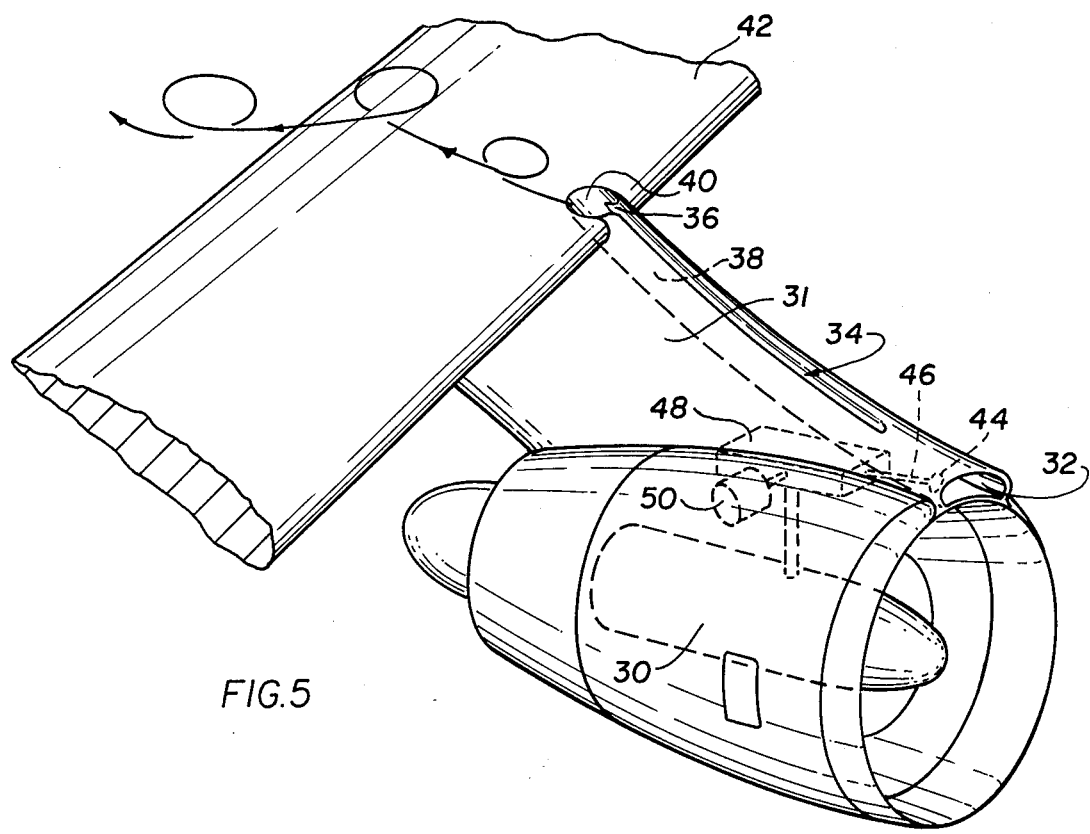
FIG. 5 is a perspective view of another embodiment of the present invention mounted to an aircraft engine pylon.

FIG. 5 depicts the system of the present invention as mounted on an aircraft engine pylon 31.

In the configuration of FIG. 5, ram air enters inlet duct 32 above engine 30 where it provides positive pressure against the turbine blades 44. Shaft power is communicated via connecting rod 46 to accessory gearbox 48. The gearbox output is coupled to load 50 as to provide electrical, hydraulic or compressive power as desired. Slot 34 and turning vane 36 create a vortex airflow as described in connection with FIGS. 1-3. The vortex airflow leaves tower 38 through exit 40 whereupon it travels over wing 42 and is then dispersed into 38 through exit 40 whereupon it travels over wing 42 and is then dispersed into the surrounding environment.

The precise location of the tower exit is selected so as to minimize detrimental aerodynamic affects on the vehicle and to take advantage of any achieveable positive affects of the increased airflow and the vortex itself. Likewise the tower size may be determined by wind tunnel testing in order to optimize apparatus performance with respect to the particular vehicle characteristics and requirements.

Figure 6:
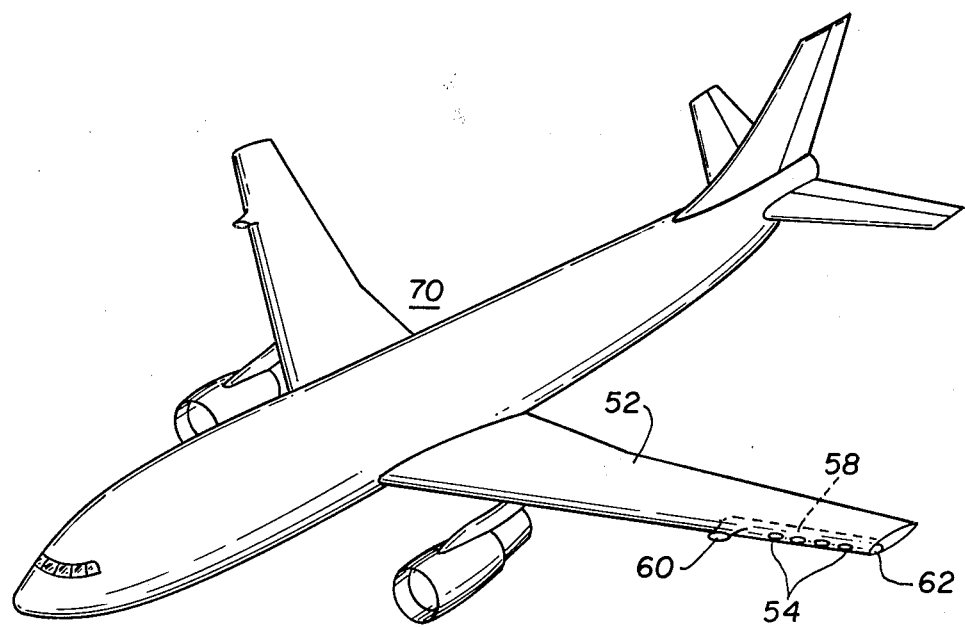
FIG. 6 is a perspective view of another embodiment of the invention as connected to an aircraft wing.

In FIG. 6 the present system is shown in conjunction with an aircraft wing. In this embodiment, the ram air inlet duct 60 is adjacent to the body of aircraft 70 and the downstream air inlet means 54 comprises a plurality of apertures situated along the leading edge of wing 52. Vortex turning means (not shown) is a curved member interposed within chamber 58 which channels air as to form a vortex air flow within the chamber. Air exits the system through discharge duct 62.

As will be obvious to one skilled in the art, various modifications may be made without departing from the scope and spirit of the invention as described in the appended claims. By way of example, alternative designs may be utilized to allow air to enter or leave the system. Further modifications may include sundry vortex turning schemes, each of which is capable of producing a vortex flow regime that augments the pressure differential across the turbine blades.

What is claimed is:

1. Aircraft apparatus for generating rotating shaft power from atmospheric air comprising:
    an open ended tower fixed to a leading edge of an aircraft, said tower including first air inlet means for admitting air into said tower along a substantial length thereof, and means for continually channelling the flow of air entering said first air inlet means as to create a vortex flow regime having a low pressure core within said tower;
    second air inlet means for admitting air into one end of said tower; and
    turbo machine means interposed within said tower between said second air inlet means and said low pressure core, said machine means being adapted to be driven by positive fluid pressure entering said second air inlet means as augmented by relatively negative fluid pressure in the proximity of said low pressure core.

2. Aircraft apparatus for generating shaft power from atmospheric air comprising:
    an open ended tower fixed to a leading vertical edge of the aircraft, said tower including a longitudinal slot extending along a substantial vertical length of said tower and a curved lip member rigidly fixed to the outer surface of said tower substantially coextensive with said slot, and a curved turning vane rigidly mounted to the interior surface of said tower as to channel the flow of air entering said slot to create a vortex flow regime having a low pressure core within said tower;
    ram air inlet means in fluid communication with the lower portion of said tower as to channel atmospheric air into the lower portion of said tower upstream of said low pressure core;

turbo machine means including a rotating vane interposed within said tower between said ram air inlet means and said low pressure core, said machine means being adapted to be driven by ram air pressure entering said ram air inlet means as augmented by relatively negative fluid pressure in the proximity of said low pressure core, and;

connecting means for communicating shaft power from said rotating vane to a transducer mechanism on the aircraft.

3. Apparatus for generating power for an aircraft from free stream air, said apparatus comprising:

a relatively cylindrical housing having first and second open ends, said housing being connected to the leading edge of an aircraft wing and so arranged in a horizontal plane as to have said first end thereof relatively forward of said second end;

air receiving means connected to said first end of said housing for receiving the flow of free stream air;

air discharge means connected to said second end of said housing;

a plurality of apertures along the length of said housing for admitting free stream air into said housing, said apertures directing said air adjacent the housing such that a vortex flow is created therefrom to develop a low pressure core within said housing intermediate said first and second ends;

turbine blades within said housing between said air receiving means and said plurality of apertures developing said low pressure core so as to be driven by the air entering said air receiving means whose flow is augmented by said low pressure core; and a transducer mechanism connected to said turbine blades to supply energy from the rotation of said turbine blades to a system in the aircraft.

4. Aircraft apparatus for generating rotating shaft power from atmospheric air comprising:

an open ended tower fixed to a leading edge of an aircraft vertical fin, said tower including first air inlet means for admitting air into said tower along a substantial length thereof, and means for continually channelling the flow of air entering said first air inlet means as to create a vortex flow regime having a low pressure core within said tower;

second air inlet means for admitting air into one end of said tower; and turbo machine means interposed within said tower between said second air inlet means and said low pressure core, said machine means being adapted to be driven by positive fluid pressure entering said second air inlet means as augmented by relatively negative fluid pressure in the proximity of said low pressure core.

5. Aircraft apparatus for generating rotating shaft power from atmospheric air comprising:

an open ended tower fixed to a leading edge of an aircraft engine pylon, said tower including first air inlet means for admitting air into said tower along a substantial length thereof, and means for continually channelling the flow of air entering said first air inlet means as to create a vortex flow regime having a low pressure core within said tower;

second air inlet means for admitting air into one end of said tower; and turbo machine means interposed within said tower between said second air inlet means and said low pressure core, said machine means being adapted to be driven by positive fluid pressure entering second air inlet means as augmented by relatively negative fluid pressure in the proximity of said low pressure core.

* * * * *

UNITED STATES PATENT AND TRADEMARK OFFICE
CERTIFICATE OF CORRECTION

PATENT NO. : 4,477,040
DATED : Oct. 16, 1984
INVENTOR(S) : James J. Karanik

It is certified that error appears in the above-identified patent and that said Letters Patent are hereby corrected as shown below:

Col. 3, line 17, change "$\frac{V^2}{2}$" to -- $\frac{v^2}{2}$ --; change "$e^\nabla$" to --$e^{\bar{v}}$--

Col. 3, line 25, change "$\rho$" to -- e --

Col. 3, line 28, change "p/$\rho$" to -- p/e --

Col. 3, line 47, change "relates" to -- relate --.

Col. 4, lines 6 and 7, cancel "38 through exit 40 whereupon it travels over wing 42 and is then dispersed into".

Signed and Sealed this

Twenty-third Day of July 1985

[SEAL]

Attest:

DONALD J. QUIGG

Attesting Officer

Acting Commissioner of Patents and Trademarks